US012103027B2

(12) United States Patent
Carideo et al.

(10) Patent No.: US 12,103,027 B2
(45) Date of Patent: Oct. 1, 2024

(54) REMOTE PRIMING OF TEXTURE SPRAYER

(71) Applicant: Graco Minnesota Inc., Minneapolis, MN (US)

(72) Inventors: Max Carideo, Plymouth, MN (US); Steven D. Becker, Blaine, MN (US); August F. Legatt, Maple Lake, MN (US); Mark D. Shultz, Fridley, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 1011 days.

(21) Appl. No.: 16/949,352

(22) Filed: Oct. 26, 2020

(65) Prior Publication Data

US 2021/0039121 A1 Feb. 11, 2021

Related U.S. Application Data

(63) Continuation of application No. 15/411,001, filed on Jan. 20, 2017, now Pat. No. 10,814,340.
(Continued)

(51) Int. Cl.

| | |
|---|---|
| ***B05B 7/14*** | (2006.01) |
| ***F04B 35/04*** | (2006.01) |
| ***F04B 35/06*** | (2006.01) |
| ***F04B 49/06*** | (2006.01) |
| ***F04B 49/08*** | (2006.01) |
| *B05B 7/00* | (2006.01) |

(52) U.S. Cl.
CPC .......... *B05B 7/1486* (2013.01); *B05B 7/1404* (2013.01); *F04B 35/04* (2013.01);
(Continued)

(58) Field of Classification Search
CPC ... B05B 7/2491; B05B 7/0416; B05B 7/1404; B05B 7/1486; B05B 7/0093;
(Continued)

(56) References Cited

U.S. PATENT DOCUMENTS 2,687,739 A 8/1954 Shelburne et al.
3,366,066 A 1/1968 Levey
(Continued)

FOREIGN PATENT DOCUMENTS

CN 2230188 Y 7/1996
CN 2526089 Y 12/2002
(Continued)

OTHER PUBLICATIONS

First Office Action from Chinese Application No. 2017100474317, dated Aug. 20, 2018, 23 pages.

*Primary Examiner* — Jason J Boeckmann
(74) *Attorney, Agent, or Firm* — Kinney & Lange, P. A.

(57) ABSTRACT

Apparatus and associated methods relate to remote priming of a texture sprayer. The texture sprayer includes a main unit, a hose assembly and a spray gun, the main unit includes an air compressor, a sensor that senses a parameter of air compressed by the air compressor, and a texture material pump that is activated and deactivated in response to the parameter sensed. A spray gun can be remoted coupled to the main unit via the hose assembly. The spray gun includes a nozzle, from which the texture material is forcefully expelled as a spray, a trigger, and a prime valve. Actuation of the trigger causes the spray gun to mix the compressed air with the texture material and to forcefully expel the texture material as a spray from the nozzle, thereby causing flow of the compressed air. Opening the prime valve releases the compressed air thereby causing flow of the compressed air.

20 Claims, 5 Drawing Sheets

Related U.S. Application Data

(60) Provisional application No. 62/281,999, filed on Jan. 22, 2016, provisional application No. 62/281,992, filed on Jan. 22, 2016.

(52) U.S. Cl.
CPC .............. *F04B 35/06* (2013.01); *F04B 49/06* (2013.01); *F04B 49/08* (2013.01); *B05B 7/0093* (2013.01); *F04B 2205/05* (2013.01)

(58) Field of Classification Search
CPC ........ B05B 12/002; F04B 35/04; F04B 35/06; F04B 43/1276; F04B 49/06; F04B 49/08; F04B 2205/05
USPC .......................................................... 251/339
See application file for complete search history.

(56) References Cited

U.S. PATENT DOCUMENTS

| | | | | |
|---|---|---|---|---|
| 3,592,385 A | | 7/1971 | Ward | |
| 3,623,661 A | | 11/1971 | Wagner | |
| 4,030,857 A | | 6/1977 | Smith, Jr. | |
| 4,078,728 A | * | 3/1978 | Nordeen | F16K 5/10 137/881 |
| 4,219,131 A | | 8/1980 | Funderburgh | |
| 4,255,079 A | | 3/1981 | Piegza | |
| 4,401,264 A | | 8/1983 | Williams et al. | |
| 4,569,480 A | | 2/1986 | Levey | |
| 5,228,622 A | | 7/1993 | Murphy et al. | |
| 5,320,280 A | * | 6/1994 | Murphy | B05B 7/24 200/81.9 R |
| 5,397,054 A | | 3/1995 | Ziegs | |
| 5,796,184 A | | 8/1998 | Kuhnl et al. | |
| 5,796,330 A | | 8/1998 | Vinette | |
| 6,991,041 B2 | | 1/2006 | Laskaris et al. | |
| 7,753,290 B2 | | 7/2010 | Jacques et al. | |
| 8,337,166 B2 | | 12/2012 | Meza et al. | |
| 8,393,875 B2 | | 3/2013 | Prescott | |
| 2005/0254879 A1 | * | 11/2005 | Gundersen | F04B 41/06 401/48 |

FOREIGN PATENT DOCUMENTS

| | | |
|---|---|---|
| CN | 2625047 Y | 7/2004 |
| CN | 103758350 A | 4/2014 |
| KR | 100468488 B1 | 1/2005 |

* cited by examiner

REMOTE PRIMING OF TEXTURE SPRAYER

CROSS-REFERENCE TO RELATED APPLICATION(S)

This application is a continuation of U.S. patent application Ser. No. 15/411,001, entitled "Flow-Based Control for Texture Sprayer" by Max Carideo, Steven D. Becker, August F. Legatt, and Mark D. Shultz, filed Jan. 20, 2017, now U.S. Pat. No. 10,814,340, issued Oct. 27, 2020; which claimed the benefit of U.S. Provisional Application No. 62/281,999, filed Jan. 22, 2016 for "Flow Sensor Control of Texture Sprayer" by Max Carideo and Mark D. Shultz; and U.S. Provisional Application No. 62/281,992, filed Jan. 22, 2016 for "Remote Priming of Texture Sprayer" by Steven D. Becker and August F. Legatt, which is herein incorporated by reference

BACKGROUND

The present invention relates generally to texture sprayers, and more particularly to a flow-based control system that enables remote priming.

Texture sprayers are commonly used to apply materials or mixtures of materials to walls, ceilings, or other surfaces. Such materials can for example include solvents, adhesives, oils, paints, and other fluids, including materials with high viscosity or highly granular texture. Peristaltic pumps are used in some texture sprayers.

Texture sprayers often apply textured materials using a spray gun situated at the end of a long hose from a main unit that pressurizes spray material and provides gas pressure for pneumatic spraying. Such long hoses allow spray guns to be used in remote or hard-to-reach places that the larger main units (which include motors, pumps, material reservoirs, and other heavy equipment) could not easily access. Spray guns can be triggered to release pressurized spray material and gas in a spray pattern, but must receive pressurized gas and spray material from the main unit. Consequently, an operator using a spray gun must have some means of actuating pumps and other apparatus situated at the main unit. Additionally, texture sprayers must be primed before texture can be sprayed. In conventional systems, this priming process requires a sprayer operator to manually initiate a priming process at the main body of the sprayer.

SUMMARY

In one embodiment, the present invention is directed towards a texture sprayer that includes an air compressor, a motor, an air reservoir, a spray gun, an airflow switch, and a pressure switch. The air compressor is disposed to send the pressurized gas down a pneumatic line, and is driven by the motor. The air reservoir is connected to the pneumatic line to the receive pressurized gas from the air compressor, and to supply the pressurized gas to the pneumatic line. The spray gun receives pressurized gas from the pneumatic line, and expels the gas when actuated. The airflow and pressure switches are both disposed on the pneumatic line. The airflow switch is situated between the spray gun and the air reservoir, and powers the motor when gas flows through the airflow switch. The pressure switch powers the motor whenever pressure within the pneumatic line falls below a threshold value.

In another embodiment, the present invention includes a method of operating a texture sprayer. According to this method, a pressure is sensed at a pressure switch in a pneumatic line supplying spray air to spray gun, and airflow is sensed through the pneumatic line via a flow switch. A motor is activated in response to the sensed pressure falling below a threshold pressure value, or the sensed airflow rising above a threshold flow rate. The motor drives an air compressor whenever it is active.

The present summary is provided only by way of example, and not limitation. Other aspects of the present disclosure will be appreciated in view of the entirety of the present disclosure, including the entire text, claims, and accompanying figures.

Figure 1:
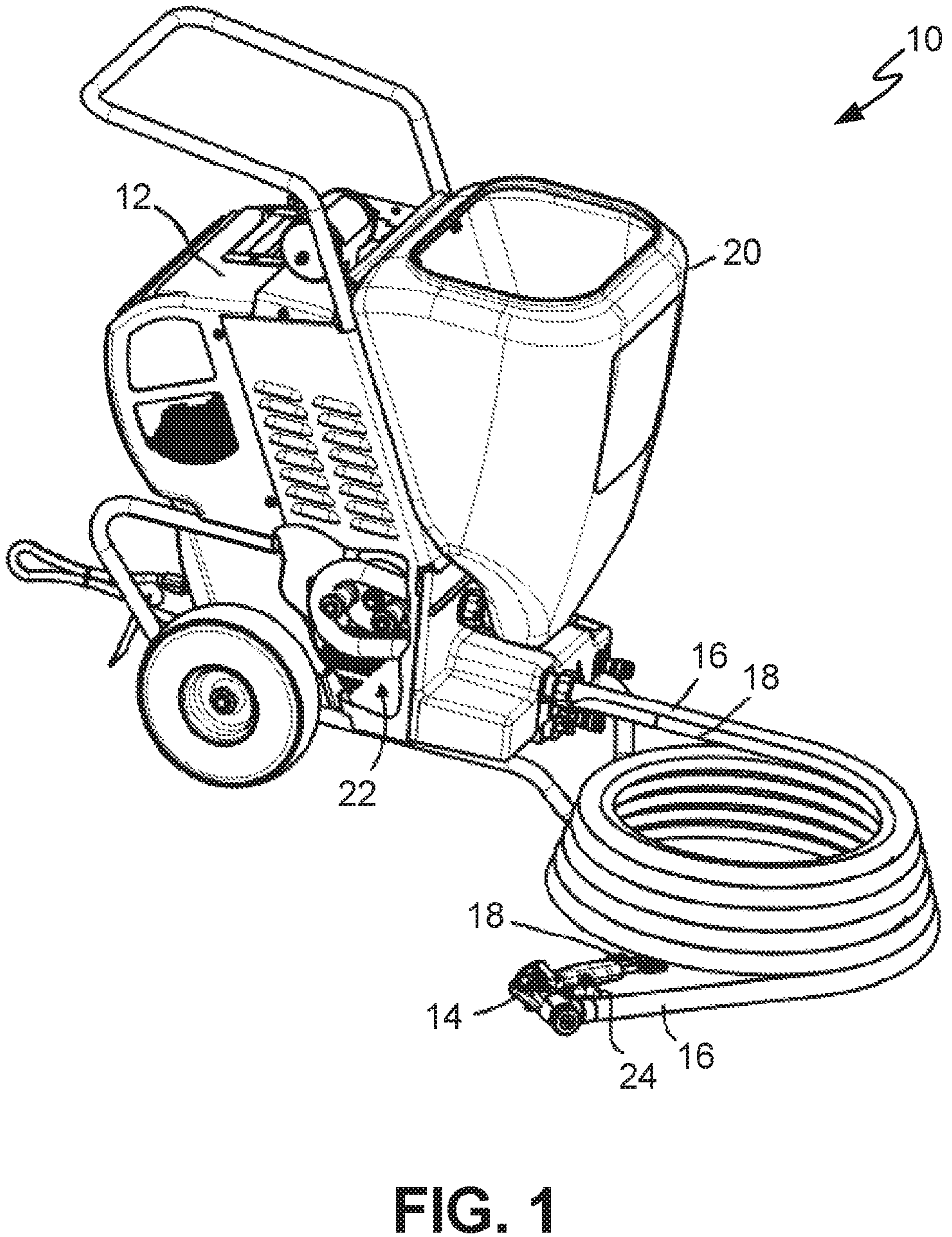
FIG. 1 is a perspective view of a texture sprayer.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure introduces a texture sprayer with a motor-driven air compressor that supplies pressurized gas for spraying and other tasks along a pneumatic line. An airflow switch along the pneumatic line powers the motor when it senses airflow through the pneumatic line, such as when air is vented to spray texture. A pressure switch powers the motor whenever pressure in the pneumatic line falls below a threshold value, thereby ensuring that airflow is always possible. This architecture allows the texture sprayer to be controlled from a spray gun, entirely based on airflow, and permits remote priming of the sprayer by venting airflow through a prime valve located at the spray gun.

FIG. 1 is a perspective view of texture sprayer 10, which includes main unit 12, spray gun 14, fluid hose 16, air hose 18, texture receptacle 20, pump 22, and trigger 24. Main unit 12 is a pneumatic texture sprayer connected to spray gun 14 by fluid hose 16 and air hose 18. Main unit 12 of texture sprayer 10 contains an electrical system, controls, an electric motor (e.g. a brushless or universal-type motor), an air compressor (e.g. an oilless air compressor or analogous pressurizing system), and texture receptacle 20, which are discussed in greater detail schematically with respect to FIG. 2. Texture receptacle 20 can, for example, be a hopper, barrel, or other reservoir of material to be pressurized and sprayed by sprayer system 10. FIG. 1 also provides a cutaway view of pump 22. While pump 22 is depicted as a peristaltic pump, other types of pumps such as piston pumps, diaphragm pumps, and rotor stator pumps can alternatively be used. Pump 22 receives and pressurizes texture from texture receptacle 20, and supplies this pressurized material to spray gun 14 via fluid hose 16. In some embodiments main unit 12 can further include an air accumulator that stores pressurized air released via a valve through air hose 18 to spray gun 14.

Spray gun 14 is a handheld, manually triggered pneumatic applicator that receives fluid or flowable solid texture from fluid hose 16, and pressurized gas from air hose 18. Spray gun 14 includes trigger 24 which, when actuated, opens at least one valve within spray gun 14. The pressure in fluid hose 16 can be sufficient to eject texture material from spray gun 14. In some embodiments, however, pressurized air from air hose 18 is mixed with material from fluid hose 16 to forcefully expel the resulting mixture, e.g. in a flat or conical spray pattern.

Figure 2:
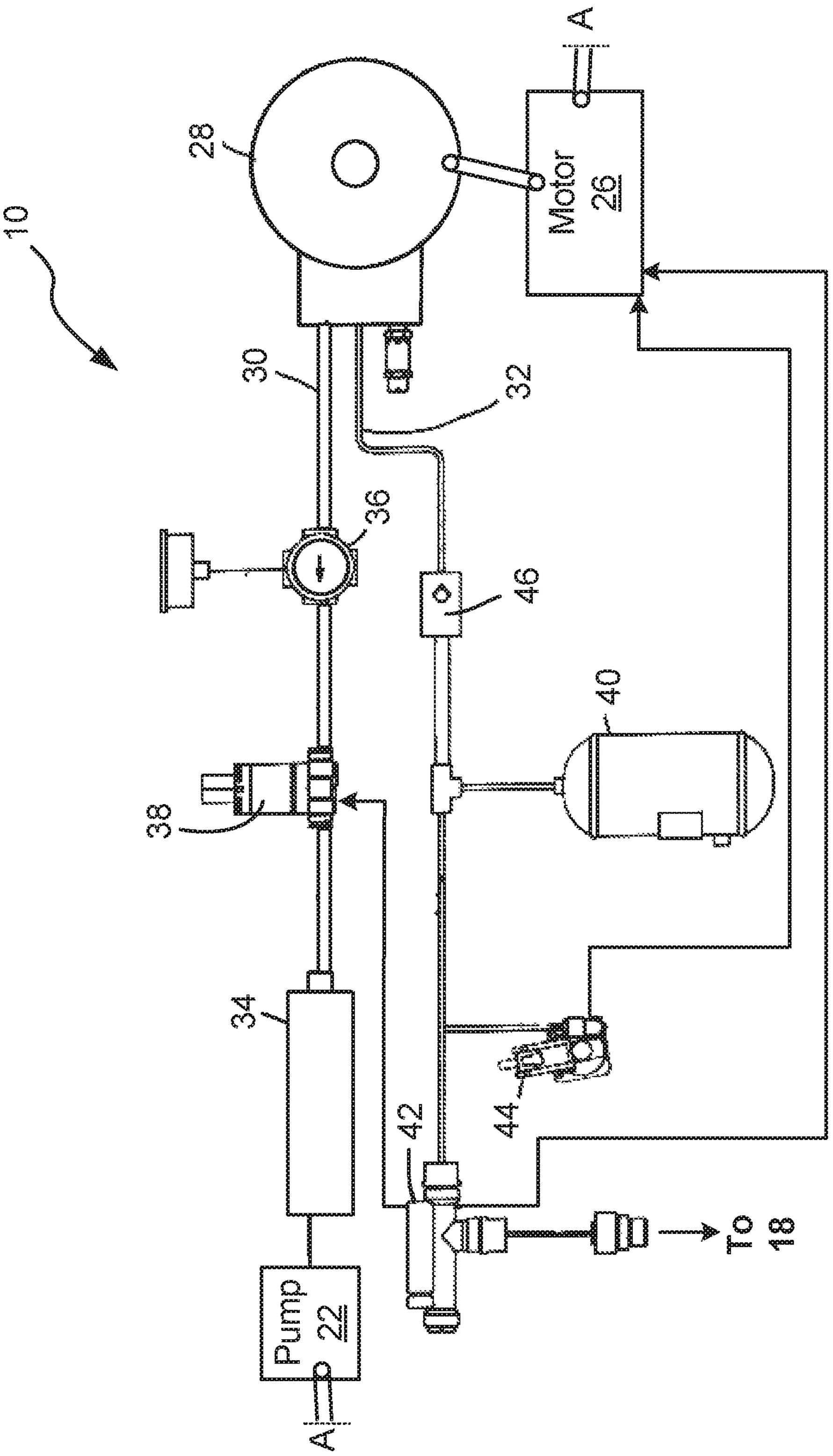
FIG. 2 is a schematic view of the texture sprayer of FIG. 1.

FIG. 2 is a schematic view of texture sprayer 10. In particular, FIG. 2 illustrates air flow for the pressurization and release of air within main unit 12. FIG. 2 depicts pump 22, motor 26, air compressor 28, first pneumatic line 30, and second pneumatic line 32. First pneumatic line 30 supplies pressurized gas from air compressor 28 to cylinder 34 through regulator 36 and solenoid valve 38. Second pneumatic line 32 supplies pressurized gas to air reservoir 40, and to air hose 18 via flow switch 42. Second pneumatic line 32 further includes pressure switch 44 and one-way valve 46.

Motor 26 can, for example, be a brushless or universal-type motor. Motor 26 mechanically drives air compressor 28, and can in some embodiments also pump 22. In an exemplary embodiment, motor 26 can for example rotate two belts, one driving air compressor 28 and the other driving pump 22. Air compressor 28 can, for example, be an oilless-type air compressor. More generally, however, air compressor 28 can be any suitable gas pressurizing device. Air compressor 28 supplies gas to both first and second pneumatic lines 30 and 32, respectively, and can additionally have one or more pressure relief valves to bleed off excess pneumatic pressure.

For embodiments wherein pump 22 is a peristaltic pump, motor 26 can for example rotate a rotor carrying rollers of the peristaltic pump. In such embodiments, however, rollers of the pump may engage a pump hose of the peristaltic pump when driven into a working position by actuation of air cylinder 34. In the illustrated embodiment, first pneumatic line 30 governs this process. Regulator 36 regulates pressure within first pneumatic line 30, which supplies pressurized gas from air compressor 28 to drive cylinder 34. Cylinder 34 is a hydraulic piston cylinder coupled to pump 22 to engage and activate pump 22 (e.g. by forcing peristaltic rollers into engagement with a peristaltic pump hose) when pressurized. Cylinder 34 can, for example, be biased towards a disengaged position, so as to disengage pump 22 when not pressurized. Solenoid valve 38 opens and closes first pneumatic line 30 to cylinder 34 based on electrical signals from flow switch 42, as described in detail below, thereby selective activating and deactivating pump 22.

Second pneumatic line 32 transmits pressurized gas from air compressor 28 through one-way valve 46 to air reservoir 40. Air reservoir 40 is a tank or pressure vessel that serves as a pressurized gas accumulator, and one-way valve 46 prevents back-flow of pressurized gas from air reservoir 40 along second pneumatic line 32. Air compressor 28 and air reservoir 40 (when pressurized) together supply pressurized gas to air hose 18 through flow switch 42, which senses movement of air though second pneumatic line 32 and activates power to motor 26 only when air is flowing through second pneumatic line 32. Flow switch 42 can, for example, be a magnetic piston that activates a reed switch. Because all airflow to spray gun 14 (i.e. through air hose 18) passes through flow switch 42, flow switch 42 activates whenever an operator triggers spray gun 14 to vent air through a nozzle of spray gun 14 to spray texture. Flow switch 42 can also activate if an operator manually vents gas at spray gun 14 using a prime valve, as described in detail below with respect to FIGS. 3, 4A, and 4B.

Pressure switch 44 is also situated along second pneumatic line 32. Pressure switch 44 senses pressure within second pneumatic line 32, and activates motor 26 whenever pressure in second pneumatic line 32 falls below a threshold value selected to provide adequate airflow. Pressure switch 44 thus enables airflow-based actuation of texture sprayer system 10 by ensuring sufficient air pressure within second pneumatic line 32 that airflow is always possible. In particular, the threshold pressure below which pressure switch 44 activates motor 26 is at least high enough to produce airflow sufficient to trigger flow switch 42, should spray gun 14 be actuated to vent air by spraying or opening a prime valve (see below). Pressure switch 44 builds adequate pressure within second pneumatic line during startup of texture sprayer 10, and ensures adequate pressure despite minor airflow leakages caused by any imperfect seals.

In some embodiments motor 26 operates in a binary fashion such that it is either fully on or fully off, with no intermediate output setting. In some embodiments of texture sprayer 10, motor 26 may run only when activated by flow switch 42 or pressures switch, and not otherwise. Such embodiments advantageously minimize wear, noise, and energy consumption associated with prolonged running of motor 26 and air compressor 28. In some such embodiments flow switch 42 and/or pressure switch 44 may operate as electrical interrupts disposed in parallel between motor 26 and a power source (not shown) such as a generator, battery, supercapacitor, or external power source. In other embodiments, however, motor 26 can be activatable by additional means independent of flow switch 42 and pressures switch 44, such as via a manual switch or controller.

Flow switch 42 can also be used to engage or disengage pump 22 by actuating or deactivating cylinder 34 on first pneumatic line 30 by means of solenoid valve 38. Flow sensor 42 opens solenoid valve 38 when flow sensor 42 senses airflow through second pneumatic line 32, thereby pressurizing cylinder 34 (as discussed above) and driving rollers and pump hose of pump 20 into engagement. This method of operation for pump 22 prevents mere activation of pressure switch 44 from also starting pump 22. According to this method, a low pressure condition (e.g. during system startup or to overcome a leak) that necessitates activating motor 26 and air compressor 28 will not necessarily engage pump 22. This approach ensures that pump 22 runs only while air compressor 28 is active, and consequently avoids unnecessary pump operation and wear.

As mentioned above, it may be necessary to prime pump 22, and in some cases also fluid hose 18 and spray gun 14, with texture mixture before spraying in earnest (i.e. applying texture to targeted surfaces). Since the present architecture only activates pump 22 when air flow is detected in second pneumatic line 30, priming is accomplished by bleeding air from second pneumatic line 30. In some embodiments this may be accomplished by venting air at main unit 12. Because spraying operations often take place with spray gun 14 distant from main unit 14, however, some embodiments of spray gun 14 are provided with prime valves to bleed or vent air from second pneumatic line 30, as discussed in detail below with respect to FIGS. 3, 4A, and 4B. Priming can be accomplished without such a prime valve by actuating trigger 24 (i.e. as if for normal texture spraying), but doing so risks prematurely spraying texture mixture from spray gun 14, and in particular can result in an irregular stream of texture mixture from an incompletely primed fluid line. The remote priming system using a prime valve on spray gun 14 addresses these concerns.

Figure 3:
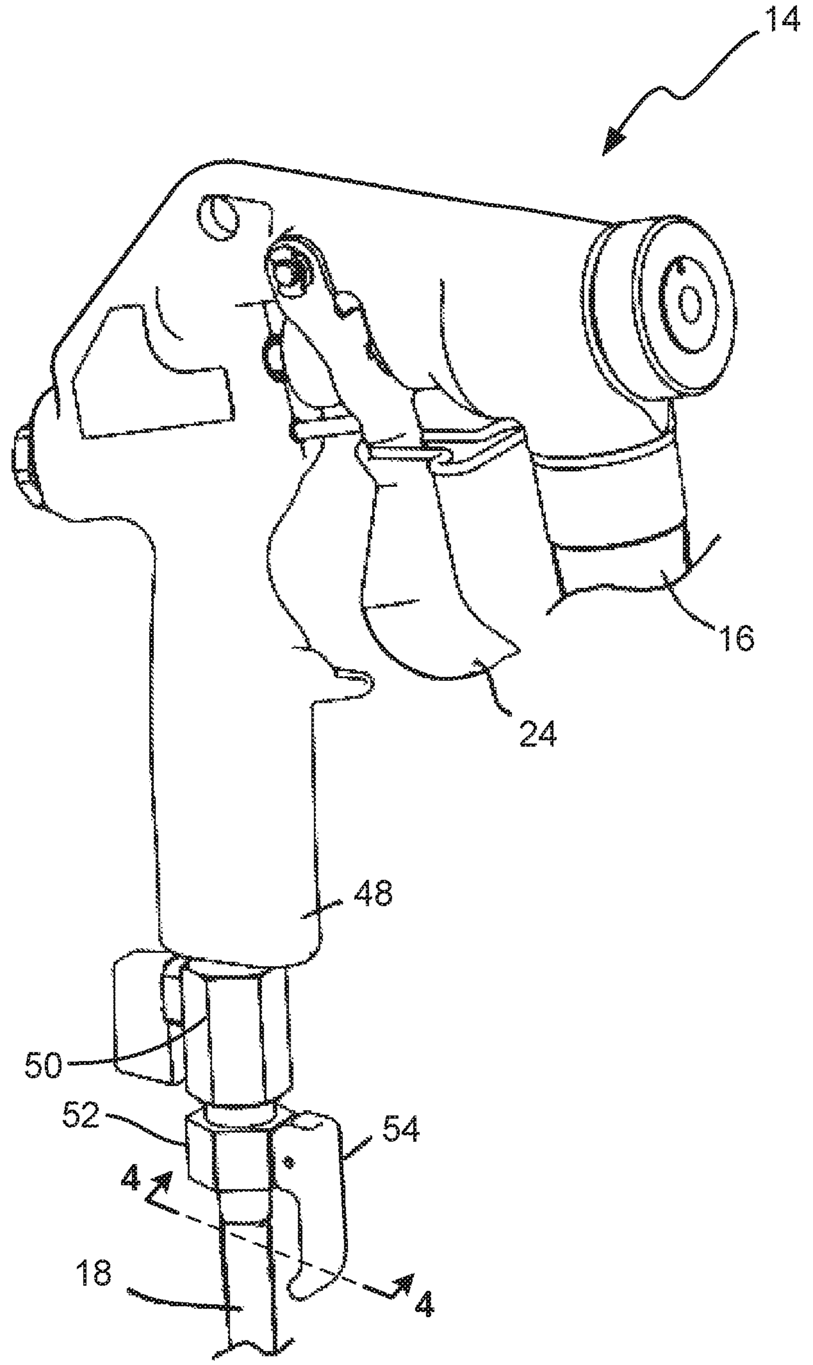
FIG. 3 is a perspective view of a spray gun of the texture sprayer of FIGS. 1 and 2.

FIG. 3 provides a detailed perspective view of spray gun 14. Spray gun 14 receives fluid hose 16 and air hose 18, and has handle 48 with shutoff valve 50 and prime valve 52 (with lever 54). Shutoff valve 50 is a gas valve capable of cutting off airflow from air hose 18 to spray gun 14. Shutoff valve 50 can, for example, be a lever, ball, shuttle, or pin valve. Shutoff valve 50 can be capable of metering airflow to spray gun 14, or can be a binary open/closed valve. Prime valve 52 is a venting valve used to trigger a priming process of texture sprayer 10 by releasing air from air hose 18. In some embodiments, prime valve 52 is a modular component that can be threaded into a pneumatic port of spray gun 14, in line with air hose 18. In the illustrated embodiment, prime valve 52 is a binary open/closed valve actuated by turning lever 54. Based on the position of lever 54, prime valve 52 can bleed off air from air hose 18 to cause airflow through second pneumatic line 32, thereby activating motor 26 and allowing texture sprayer 10 to be primed without permitting texture mixture to unintentionally shoot from spray gun 14. Prime valve 52 is discussed in greater detail with respect to FIGS. 4A and 4B.

Figure 4A:
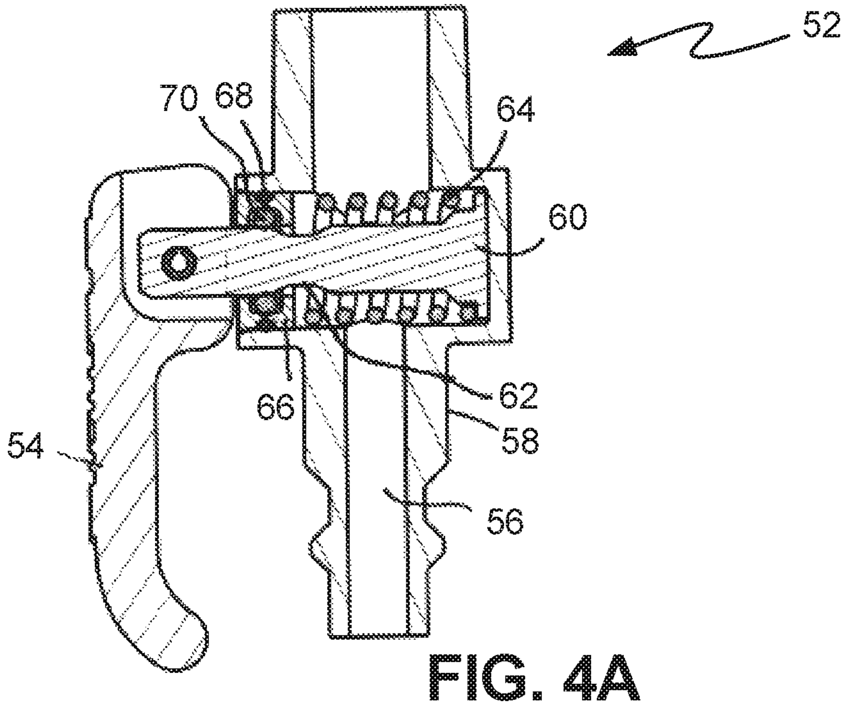
FIGS. 4A and 4B are cross-sectional views depicting closed and open states, respectively, of a prime valve of the spray gun of FIG. 3.
Figure 4B:
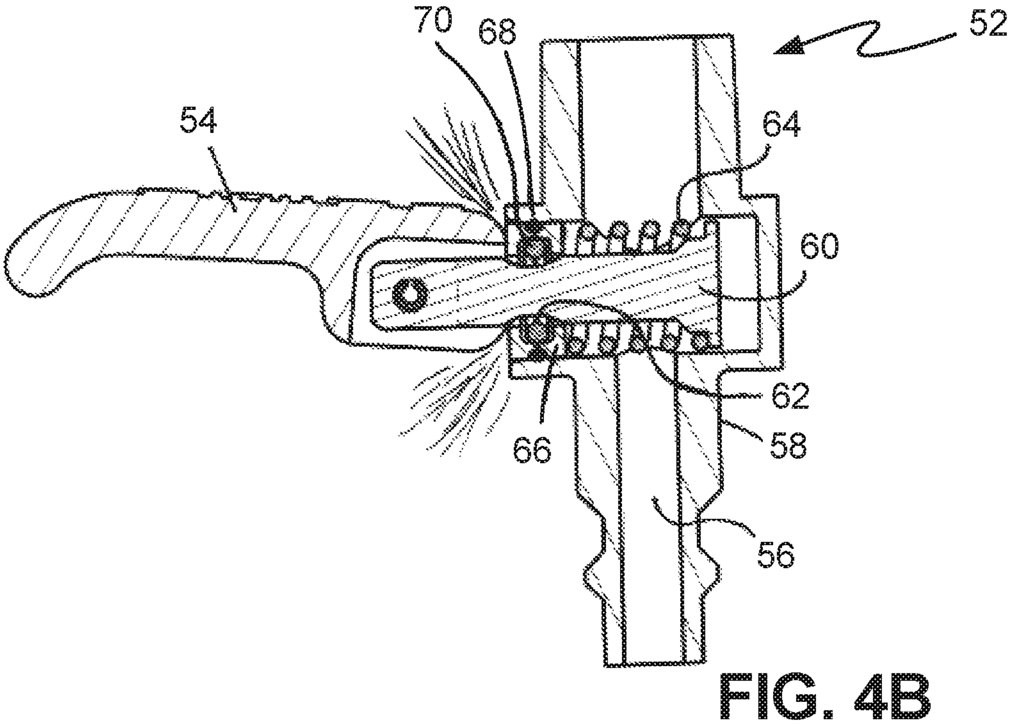

FIGS. 4A and 4B are cross-sectional views of prime valve 52 of spray gun 14 through section line 4-4 (see FIG. 3). Specifically, FIG. 4A shows prime valve 52 in a closed state (as shown in FIG. 3), while FIG. 4B shows prime valve 52 in an open state used to prime the fluid system of texture sprayer 10. FIGS. 4A and 4B illustrate lever 54, interior cavity 56, rigid body 58, stem 60, recessed portion 62, spring 64, retainer 66, and O-rings 68 and 70.

Interior cavity 56 of prime valve 52 is defined by rigid body 58, a substantially annular valve housing. Interior cavity 56 connects air hose 18 with spray gun 14 without leakage while closed (FIG. 4A), but vents air while open (FIG. 4B). Rigid body 58 can, for example, be made of stainless steel or other metals. The illustrated embodiment of prime valve 52 includes a quick-disconnect bayonet on its inlet and a male NPT thread at its outlet, but more generally any mating geometry may be used to connect rigid body 58 of prime valve 52 to upstream and downstream components.

Stem 60 is a substantially cylindrical sealing element that extends orthogonally to the main axis of prime valve 52 through interior cavity 56 without preventing airflow through interior cavity 56. Stem 60 has recessed portion 62 that is narrowed relative to the cylinder diameter of the remainder of stem 60. Recessed portion 62 can, for example, be a tapered neck extending fully around stem 60, or a pinched section of stem 60 that is reduced relative to the diameter of stem 60 only within a limited circumferential position of stem 60. Stem 60 is biased into position flush against rigid body 58 by spring 64.

Retainer 66 supports O-rings 68 and 70, both of which can be static sealing elements. In the illustrated embodiment O-ring 68 engages rigid body 58 at all times, while O-ring 70 engages stem 60 only while stem 60 is in a "closed" position. Retainer 66 can, for example, be a circular disk that is press fit into rigid body 58. Prime valve 52 is opened and closed by rotating lever 54. As shown in FIG. 4A, lever 54 does not oppose the biasing spring force of spring 64 while lever 54 is oriented along the axis of interior cavity 56. As shown in FIG. 4B, however, turning lever 54 away from prime valve 52 (e.g. at close to a right angle to its "closed" position) draws stem 60 away from an opposite wall of rigid body 58, compressing spring 64 and bringing recessed portion 62 within O-ring 70. Because recessed portion 62 has at least some circumferential element narrower than the remainder of stem 60—and narrower than O-ring 70—this change in position permits gas to escape interior cavity 56 through O-ring 70. The gap through which gas escapes can, for example, be annular.

Advantageously, the present design allows recessed portion 62 to be stored within prime valve 52 when prime valve 52 is closed. Texture spraying can result in texture material accumulating in unintended areas, and sheltering recessed portion 62 as described herein prevents texture material from infiltrating (and potentially clogging) the escape pathway of the valve. Moreover, opening prime valve 52 causes escaping air to blast away any texture material that has accumulated near the exit of the valve. When lever 54 is closed (i.e. returning from the state of FIG. 4B to that of FIG. 4A), spring 64 exerts force on stem 60 to close prime valve 52.

Figure 5:
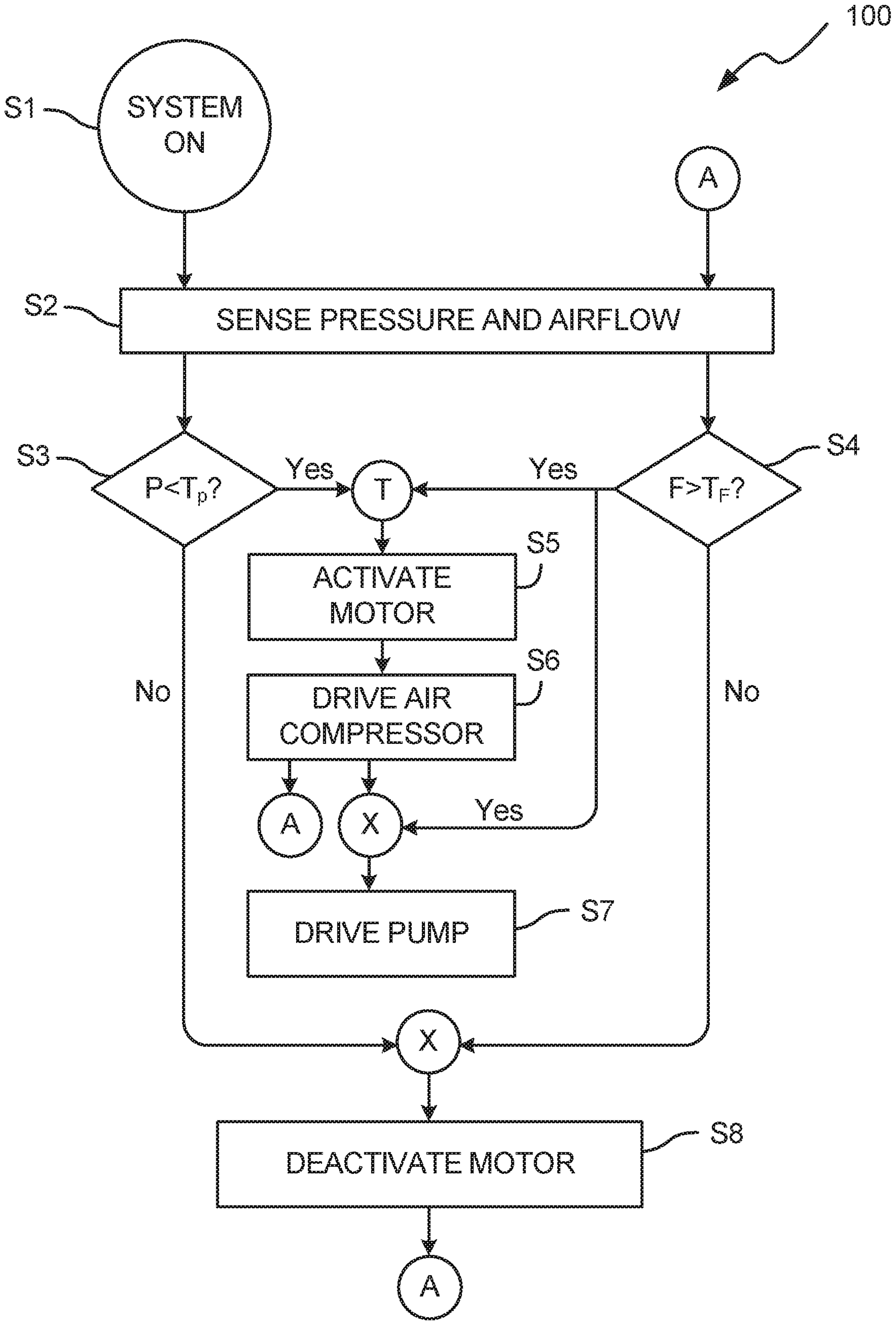
FIG. 5 is a logic flowchart describing the operation of the texture sprayer of FIGS. 1 and 2.

FIG. 5 is a logic flowchart describing the operation of the texture sprayer 10 according to method 100. When texture sprayer 10 is turned on (Step S1), flow switch 42 and pressure switch 44 are powered (as necessary; in some embodiments flow switch 42 and/or pressure switch 44 may be passive sensors) to sense pressure and airflow, respectively, within second pneumatic line 32. (Step S2). Pressure switch 44 responds to pressures below a threshold pressure, as described above. (Step S3). Flow switch responds to airflow rates above a threshold flow rate, which can in some cases by any nonzero airflow. (Step S4). If the sensed pressure falls below the pressure threshold or the airflow rate rises above the airflow threshold, the appropriate switch activates motor 26 (Step S5), which drives air compressor 28 (Step S6) to drive pressurized air into second pneumatic line 32. If airflow is above the threshold flow rate, pump 22 is additionally engaged and driven by motor 26. (Step S7). If motor 26 is active, sensed pressure is above the threshold pressure, and sensed airflow is below the threshold flow rate, motor 26 is deactivated. (Step S8). Flow switch 42 and pressure switch 44 continue sensing airflow and pressure, respectively, after activating and/or deactivating motor 26. In some embodiments flow switch 42 and pressure switch 44 monitor airflow and pressure continuously. In other embodiments at least one of flow switch 42 and pressure switch 44 activates only periodically or intermittently to determine sensed values along second pneumatic line 32.

Texture sprayer 10 activates motor 26 and accordingly air compressor 28 based on airflow through flow switch 42, or alternative in response to low pressure within second pneumatic line 32. This architecture allows the texture sprayer to be controlled from a spray gun, entirely based on airflow, and permits remote priming of the sprayer by venting airflow through a prime valve located at the spray gun.

Discussion of Possible Embodiments

The following are non-exclusive descriptions of possible embodiments of the present invention.

A texture sprayer comprising: an air compressor disposed to send pressurized gas down a pneumatic line; a motor attached to the air compressor so as to drive the air compressor; a spray gun disposed to receive the pressurized gas from the pneumatic line, and to expel the pressurized gas when actuated; an airflow switch disposed on the pneumatic line, fluidly between the spray gun air compressor, and configured to activate the motor when gas flows through the airflow switch; and a pressure switch disposed on the pneumatic line, and configured to activate the motor when pressure within the pneumatic line falls below a threshold value.

The texture sprayer of the preceding paragraph can optionally include, additionally and/or alternatively, any one or more of the following features, configurations and/or additional components:

A further embodiment of the foregoing texture sprayer, wherein the motor is only activated by the airflow switch and the pressure switch.

A further embodiment of the foregoing texture sprayer, further comprising a power source, and wherein at least one of the airflow switch and the pressure switch is a voltage cutoff switch situated between the power source and the motor.

A further embodiment of the foregoing texture sprayer, further comprising: a fluid pump driven by the motor.

A further embodiment of the foregoing texture sprayer, wherein the spray gun receives pressurized texture material from the fluid pump, and expels a mixture of the pressurized texture material with gas from the pneumatic line from a nozzle in a spray pattern.

A further embodiment of the foregoing texture sprayer, wherein the spray gun further comprises a prime valve disposed to vent gas from the pneumatic line without expelling the pressurized texture material.

A further embodiment of the foregoing texture sprayer, wherein the prime valve comprises: a rigid body defining an interior cavity in fluid communication with the pneumatic line; and a sealing structure extending into but not blocking the interior cavity, and actuatable to vent gas from the pneumatic line through an outlet.

A further embodiment of the foregoing texture sprayer, wherein the sealing element comprises: an O-ring; a stem having a non-recessed portion configured to engage the O-ring in an air seal, and a recessed portion incapable of forming an air seal with the O-ring; a spring disposed to bias the non-recessed portion of the stem into engagement with the O-ring via a spring force; and a lever actuatable to oppose the spring force, thereby bringing the recessed portion into alignment with the O-ring.

A further embodiment of the foregoing texture sprayer, wherein the recessed portion of the stem is situated within the interior cavity whenever the lever is not actuated to oppose the spring force.

A further embodiment of the foregoing texture sprayer, wherein the fluid pump is a peristaltic pump, the texture sprayer further comprising: a pneumatic piston cylinder disposed to drive rollers of the peristaltic pump into engagement with a pump hose when pressurized; and an auxiliary pneumatic line from the air compressor to the pneumatic piston.

A further embodiment of the foregoing texture sprayer, wherein the fluid pump is engaged only when flow switch activates the motor, and not when the pressure switch activates the motor.

A further embodiment of the foregoing texture sprayer, further comprising: an air reservoir connected to the pneumatic line to receive pressurized gas from the air compressor, and supply the pressurized gas to the pneumatic line.

A further embodiment of the foregoing texture sprayer, further comprising: a one-way valve disposed along the pneumatic line, downstream of the air compressor.

A further embodiment of the foregoing texture sprayer, wherein the air reservoir and the pressure sensor are disposed in parallel with the airflow sensor.

A further embodiment of the foregoing texture sprayer, wherein the flow switch is a magnetic piston that activates a reed switch.

A further embodiment of the foregoing texture sprayer, wherein the threshold value is selected to provide at least sufficient airflow to trigger the airflow switch when the spray gun is actuated.

A method of operating a texture sprayer, the method comprising: sensing pressure at a pressure switch in a pneumatic line supplying spray air to spray gun; sensing airflow through the pneumatic line via a flow switch; activating a motor in response to the sensed pressure falling below a threshold pressure value; activating the motor in response to the sensed airflow rising above a threshold flow rate; and driving an air compressor whenever the motor is active.

The method of the preceding paragraph can optionally include, additionally and/or alternatively, any one or more of the following features, configurations and/or additional components:

A further embodiment of the foregoing method, further comprising: engaging and activating a pump in response to the sensed airflow rate rising above the threshold flow rate.

A further embodiment of the foregoing method, further comprising deactivating the motor in response to both the sensed pressure rising above the threshold pressure value and the sensed airflow falling below the threshold flow rate.

A further embodiment of the foregoing method, further comprising: priming the texture sprayer by venting air from a priming valve of the spray gun without ejecting air from a nozzle of the spray gun.

A further embodiment of the foregoing method, wherein the threshold pressure value is selected to ensure that actuating the spray gun results in airflow detectable by the flow switch.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A texture sprayer with remote priming, the texture sprayer comprising:

a main unit, the main unit comprising:

an air compressor configured to compress air;

a sensor that outputs a signal based on a parameter of the compressed air; and a texture material pump configured to pump texture material, the texture material pump activated to displace the texture material in response to the signal output by the sensor;

a hose assembly comprising:

a first hose configured to fluidly connect to the texture material pump to provide flow of the texture material output by the texture material pump; and a second hose configured to fluidly connect to the air compressor to provide flow of the compressed air output by the air compressor;

a spray gun configured to attach to the first hose to receive the texture material and to the second hose to receive the compressed air the spray gun comprising:

a nozzle, from which the texture material is forcefully expelled as a spray;

a trigger, configured to cause, when actuated, the spray gun to mix the compressed air with the texture material to forcefully expel the texture material as a spray from the nozzle, wherein such actuation of the trigger causes flow of the compressed air, which is detectable by the sensor to cause activation of the texture material pump, and a prime valve configured to vent, when open, the compressed air thereby causing flow of the compressed air, which is detectable by the sensor to cause activation of the texture material pump such that the texture material pump drives the texture material to the spray gun while the compressed air is vented prior to the compressed air mixing with the texture material.

2. The texture sprayer of claim 1, wherein opening the prime valve without actuating the trigger causes priming of the spray gun with the texture material without forcefully expelling the texture material as a spray from the spray gun with the compressed air.

3. The texture sprayer of claim 1, wherein the sensor is an airflow switch, and the sensed parameter is a flow rate of the compressed air.

4. The texture sprayer of claim 3, wherein the texture material pump is activated in response to sensing flow of the compressed air.

5. The texture sprayer of claim 1, wherein the compressed air released by the prime valve is released into an external atmosphere.

6. The texture sprayer of claim 1, wherein the main unit further comprises:

a fluid line for providing the texture material pumped by the texture material pump to a first connector configured to couple to the first hose; and a pneumatic line for providing the compressed air from the air compressor to a connector configured to couple to the second hose, wherein the sensor is disposed on the pneumatic line.

7. The texture sprayer of claim 1, wherein the sensor is further configured to cause activation of the air compressor in response to the signal output.

8. The texture sprayer of claim 1, wherein the sensor is a pressure switch, and the sensed parameter is an air pressure of the compressed air.

9. The texture sprayer of claim 1, wherein the prime valve is a modular component threaded into a pneumatic port of the spray gun.

10. The texture sprayer of claim 1, further comprising:

a motor that drives both of the air compressor and the texture material pump, the motor activated based on the signal output by the sensor.

11. A texture sprayer with remote priming, the texture sprayer comprising:

an air compressor configured to compress air;

a sensor that outputs a signal based on a parameter of the compressed air; and a texture material pump configured to pump texture material, the texture material pump activated to displace the texture material in response to the signal output by the sensor;

a first hose configured to fluidly connect to the texture material pump to provide flow of the texture material output by the texture material pump; and a second hose configured to fluidly connect to the air compressor to provide flow of the compressed air output by the air compressor;

a spray gun configured to receive the texture material via the first hose and to receive the compressed air via the second hose, the spray gun comprising:

a nozzle, from which the texture material is forcefully expelled as a spray; and a trigger, configured to cause, when actuated, the spray gun to mix the compressed air with the texture material to forcefully expel the texture material as a spray from the nozzle, wherein such actuation of the trigger causes flow of the compressed air, which is detectable by the sensor to cause activation of the texture material pump, a prime valve configured to vent, when open, the compressed air thereby causing flow of the compressed air, which is detectable by the sensor to cause activation of the texture material pump such that the texture material pump drives the texture material to the spray gun while the compressed air is vented prior to the texture material reaching the spray gun during priming.

12. The texture sprayer of claim 11, wherein opening the prime valve without actuating the trigger causes priming of the spray gun with the texture material without forcefully expelling the texture material as a spray from the spray gun with the compressed air.

13. The texture sprayer of claim 11, wherein the sensor is an airflow switch, and the sensed parameter is a flow rate of the compressed air.

14. The texture sprayer of claim 13, wherein the texture material pump is activated in response to sensing flow of the compressed air.

15. The texture sprayer of claim 11, wherein the compressed air released by the prime valve is released into an external atmosphere.

16. The texture sprayer of claim 11, further comprising:

a fluid line for providing the texture material pumped by the texture material pump to the first hose; and a pneumatic line for providing the compressed air from the air compressor to the second hose, wherein the sensor is disposed on the pneumatic line.

17. The texture sprayer of claim 11, wherein the sensor is further configured to cause activation of the air compressor in response to the signal output.

18. The texture sprayer of claim 11, wherein the sensor is a pressure switch, and the sensed parameter is an air pressure of the compressed air.

19. The texture sprayer of claim 11, further comprising:

a motor that drives both of the air compressor and the texture material pump, the motor activated based on the signal output by the sensor.

20. A texture sprayer with remote priming, the texture sprayer comprising:

a main unit, the main unit comprising:

an air compressor configured to compress air;

a sensor that outputs a signal based on a parameter of the compressed air; and a texture material pump configured to pump texture material, the texture material pump activated to displace the texture material in response to the signal output by the sensor;

a first hose configured to fluidly connect to the texture material pump to provide flow of the texture material output by the texture material pump; and a second hose configured to fluidly connect to the air compressor to provide flow of the compressed air output by the air compressor;

a spray gun configured to attach to the first hose to receive the texture material and to the second hose to receive the compressed air the spray gun comprising:

a nozzle, from which the texture material is forcefully expelled as a spray; and a trigger, configured to cause, when actuated, the spray gun to mix the compressed air with the texture material to forcefully expel the texture material as a spray from the nozzle, wherein such actuation of the trigger causes flow of the compressed air, which is detectable by the sensor to cause activation of the texture material pump, and a prime valve configured to vent, when open, the compressed air thereby causing flow of the compressed air, which is detectable by the sensor to cause activation of the texture material pump such that the texture material pump drives the texture material to the spray gun while the compressed air is vented without forcefully expelling the texture material from the spray gun with the compressed air as a spray.

* * * * *